US008898195B2

(12) United States Patent
Beaverson et al.

(10) Patent No.: US 8,898,195 B2
(45) Date of Patent: Nov. 25, 2014

(54) REFERENCE COUNT PROPAGATION (71) Applicant: SimpliVity Corporation, Westborough, MA (US)

(72) Inventors: Arthur J. Beaverson, Boxborough, MA (US); Kishore Chitrapu, Shrewsbury, MA (US); John Michael Czerkowicz, Somerville, MA (US); Sowmya Manjanatha, Westford, MA (US)

(73) Assignee: SimpliVity Corporation, Westborough, MA (US)

( * ) Notice: Subject to any disclaimer, the term of this patent is extended or adjusted under 35 U.S.C. 154(b) by 0 days.

(21) Appl. No.: 13/723,990

(22) Filed: Dec. 21, 2012

(65) Prior Publication Data

US 2013/0110894 A1 May 2, 2013

Related U.S. Application Data (63) Continuation of application No. 13/106,927, filed on May 13, 2011, now Pat. No. 8,346,810.

(51) Int. Cl.
*G06F 17/30* (2006.01)

(52) U.S. Cl.
CPC .... *G06F 17/30194* (2013.01); *G06F 17/30094* (2013.01)
USPC ............ 707/791; 707/802; 707/822; 707/828

(58) Field of Classification Search
CPC ..................................................... G06F 17/30
USPC ................................................ 707/600–899
See application file for complete search history.

(56) References Cited

U.S. PATENT DOCUMENTS

| | | | |
|---|---|---|---|
| 6,377,991 B1 * | 4/2002 | Smith et al. | 709/226 |
| 6,754,789 B2 * | 6/2004 | Skendzic et al. | 711/153 |
| 2011/0022566 A1 | 1/2011 | Beaverson et al. | |

OTHER PUBLICATIONS

International Search Report and Written Opinion mailed Jul. 30, 2012 in corresponding PCT/US2012/037471.
B. Goldberg, "Generational Reference Counting: A Reduced-Communication Distributed Storage Reclamation Scheme", ACM Sigplan 1989 Conference on Programming Language Design and Implementation. Portland, Oregon, US Jun. 21-13, 1989, pp. 313-321.
Mancini et al., "Fault-Tolerant Reference Counting for Garbage Collection in Distributed Systems", Computer Journal, Oxford University Press, Surrey, GB, vol. 34, No. 6, Dec. 1, 1991, pp. 503-513.
Bevan et al., "An efficient reference counting solution to the distributed garbage collection problem", Parallel Computing, Elsevier Publishers, Amsterdam, NL, vol. 9, No. 2, Jan. 1, 1989, pp. 179-192.
IBM Research Report, "Defragmentation Mechanisms for copy-on-write File Systems", Ohad Rodeh, IBM Research Division, RJ 10465 Revised (A1004-013) Apr. 26, 2010.
IBM Research Report, Defragmentation Mechanisms for Copy-on-Write File-systems, Ohad Rodeh, IBM Research Division, RJ10465 Revised (A1004-013) Apr. 26, 2010 111.

* cited by examiner

*Primary Examiner* — Issac M Woo
(74) *Attorney, Agent, or Firm* — Novak Druce Connolly Bove + Quigg LLP (57) ABSTRACT

Methods and systems are provided for tracking object instances stored on a plurality of network nodes, which tracking enables a global determination of when an object has no references across the networked nodes and can be safely de-allocated. According to one aspect of the invention, each node has a local object store for tracking and optionally storing objects on the node, and the local object stores collectively share the locally stored instances of the objects across the network. One or more applications, e.g., a file system and/or a storage system, use the local object stores for storing all persistent data of the application as objects.

15 Claims, 9 Drawing Sheets

REFERENCE COUNT PROPAGATION

FIELD OF THE INVENTION

The present invention relates to the storage of data objects, and more particularly to a method and apparatus for tracking objects stored on a plurality of nodes in a peer-to-peer network while maintaining a global view of references of the objects.

BACKGROUND

For purposes of performance or redundancy, modern storage systems can be built out of discrete components, called nodes, that are interconnected with a network, such as a TCP/IP network. Each node is typically a fully functional computer with CPUs, storage, memory, etc. The organization of nodes in such a system may be a peer-to-peer network, meaning all nodes are equal (i.e., there is no central management authority and no node is privileged). As equal peers, the nodes communicate among themselves to resolve state. Organizing a storage system as a peer-to-peer network can provide a more resilient and scalable storage solution, as nodes can be incrementally added for performance and/or capacity, and if one node fails, the storage system still works.

What distinguishes a peer-to-peer network storage system from just a collection of computers is that nodes in the system communicate with each other regarding the underlying data storage, health of each node, etc. Specifically, nodes in the system may copy and exchange information for purposes of performance and data integrity. This information may be in the form of data objects, or files, where an object may be a portion of a file.

As objects are propagated through the system, data structures are required to: a) know where the objects are; and b) know when the objects are no longer needed. In prior art systems where objects have reference counts, i.e., the number of times an object is referenced by another object or other data structure, an object may be safely de-allocated or deleted (e.g., garbage collection) when its reference count drops to zero.

However, keeping track of reference counts for billions of objects, when millions of objects are being passed around per second, results in unacceptable network traffic and CPU costs if simplistic algorithms are used.

Another challenge is determining that the reference count is actually zero, and then finding all object instances so they can be deleted. There is an ongoing need for more efficient and reliable protocols for tracking objects to overcome these problems.

SUMMARY OF THE INVENTION

In one aspect of the invention, a system and method are provided for tracking object references across a plurality of network nodes, in which objects are distributed among the nodes by storing one or more instances of an object (instances of an object contain identical data) on one or more nodes of the network. In this network, the instances of an object may all be equal (peer-to-peer), as opposed to instances among which there is some hierarchy or master/slave relationship, i.e., one instance being primary or more privileged than another. These peer-to-peer instances can be managed collectively by the network nodes, without a centralized management agent. As described below in accordance with various embodiments of the invention, methods and systems are provided for tracking these object instances stored on a plurality of network nodes, which tracking enables a global determination of when an object has no references across the networked nodes and can be safely de-allocated.

According to one aspect of the invention, each node has a local object store for tracking and optionally storing objects on the node, and the local object stores collectively share the locally stored instances of the objects across the network. One or more applications, e.g., a file system and/or a storage system, use the local object stores for storing all persistent data of the application as objects. The application may require a reference count for each object stored, the reference count comprising the number of references to the respective object. According to one aspect of the invention, the global reference count for an object can be tracked by maintaining at each node a local reference count LRC of references to object names (as opposed to object instances) at the respective node, the value of the LRC comprising a sum of reference count adjustments on the local node, wherein the LRC is independent of any instance of the object being stored in the local object store. By decoupling the reference count from the instance count, this method allows negative values (signed integers) of an LRC, contrary to prior art methods. Furthermore, by calculating a sum of the LRCs from a plurality of nodes, herein referred to as a Global Reference Count GRC, the resulting GRC can be used to determine whether for a particular application using the networked nodes to store persistent data as objects, it is safe to de-allocate an object (all instances thereof) because the object is no longer being referenced by the application. If and only if the GRC is determined to be zero, is it safe to de-allocate the object instances for a particular object.

According to another aspect of the invention, placement of object instances on one or more of the nodes is performed independent of the name of the object. Contrary to prior art methods that force an object storage location based on the object name, in various embodiments of the present invention the placement of object instances on the nodes can be determined by the actual or intended use of an object, e.g., based upon network or system performance or data reliability. For example, a local object store, knowing which file system(s) refer to a particular object, can determine a preferred placement of the object on one or more of the nodes depending upon the file system(s) that use(s) the object. This system is substantially more robust and efficient than prior art systems which restrict placement of data objects on nodes depending upon what the object is, e.g., the object's name.

According to another aspect of the invention, each local node maintains its own local index for mapping object names to physical locations on the local node where the objects are stored. This mapping index may comprise, for example, pointers to one or more locations on the local node where the object instance is stored. The entries of the local mapping index may include, for a given object name, the LRC and pointers to one or more storage locations on the local node.

In accordance with one embodiment of the invention, a computer-readable medium is provided containing executable program instructions for performing a method comprising:
  in a plurality of networked nodes for sharing of stored objects, the objects having globally unique names across the networked nodes and wherein the object names do not change based upon where the objects are stored on the nodes;
  maintaining, at each node, a Local Reference Count LRC of references to object names, independent of any object instance stored on the local node, the LRC being maintained as a signed integer, wherein a de-referencing of an object name can generate a negative LRC value.

In one embodiment the method includes:
determining a global reference count GRC comprising a sum of the LRC's.

In one embodiment the determining step includes:
identifying object instances for de-allocation when the GRC is determined to be zero.

In one embodiment the determining step includes:
implementing an eventual consistency network protocol among the nodes for determining if objects may be de-allocated.

In one embodiment the determining step includes:
assigning ownership of a range of object identifiers to one of the network nodes, wherein the one node initiates the determining step for all or a subset of the range.

In one embodiment the method step includes:
maintaining a local object store on each node, wherein the local object stores collectively comprise a namespace of the globally unique object names.

In one embodiment the method includes:
the local object store maintains a local mapping index of object name, LRC and a pointer to any physical object location where the object is stored on the local node.

In one embodiment the method includes:
each object has an object fingerprint derived from the object's content as its object name.

In one embodiment the method includes:
the fingerprint comprises a hash of the object content.

In one embodiment the method includes:
a file system using the object stores on one or a plurality of the nodes in a peer-to-peer network storage system collectively as a method to store all persistent data of the file system.

In one embodiment the method includes:
all file system data, metadata and files comprise objects of the object store(s), each object having an object fingerprint as its object name;
collections of file system objects also comprise objects of the object store(s), each collection comprising a mapping of a plurality of the file system objects and having its own object fingerprint derived from the contents of the collection, wherein a change to one or more objects of the collection changes the collection object fingerprint; and
a file system root object having a root object fingerprint, such that every object in the namespace file system is accessible through the root object.

In one embodiment the method includes:
selecting, based on network or system performance or reliability, one or more of the nodes as location(s) for storing one or more instances of an object independent of the object name.

In one embodiment the method includes:
the sharing of the stored objects comprises communicating between nodes with regard to object names, LRCs and locations of stored objects.

In one embodiment the method includes:
when an application de-references an object name and an instance of the object is not stored on a local object store, the local object store generates an LRC of negative one.

In one embodiment the method includes:
a storage system using the object stores on one or a plurality of the nodes in a peer-to-peer network storage system collectively as a method to store all persistent data of the storage system.

In accordance with another embodiment of the invention, a computer readable medium is provided containing executable instructions for performing
a method of tracking references to data objects in a distributed peer-to-peer storage system operating on a plurality of networked nodes, the objects having globally unique names across the networked nodes, each node having a local object store for naming and storing objects on the local node, and the local object stores sharing the objects,
the method comprising:
determining, on each of a plurality of local nodes, one or more locations for storing an instance of a data object on the local node;
mapping, on each of a plurality of local nodes, the one or more locations of the stored instance on the local node to the object name, wherein the location does not change the object name; and
maintaining, on each of a plurality of local nodes, a local reference count LRC of references to object names, the value of the LRC comprising a sum of reference count adjustments for the object on the local node, wherein the LRC is independent of whether any instance of the referenced object is stored on the local node.

In accordance with another embodiment of the invention, a computer readable medium is provided containing executable program instructions for performing a method comprising:
for a plurality of networked nodes, each node having a local object store for storing objects on the respective node, the objects having globally unique names across the networked nodes;
the local object stores sharing one or more of the objects; and
an application using the local object stores for storing persistent data as objects, the application requiring a reference count for each object stored on the networked nodes comprising a number of references to the respective object;
maintaining a local reference count LRC of references to object names on each node, the value of the LRC comprising a sum of reference count adjustments on the local node, wherein the LRC is independent of any instance of the referenced object being stored in the local object store so as to allow a negative value of the LRC; and
determining a global reference count GRC comprising a sum of the LRCs.

In one embodiment:
the application comprises a file system or a storage system.

In accordance with another embodiment of the invention, an apparatus is provided comprising:
a plurality of networked nodes, each node having a local object store for storing objects on the respective node and the objects having globally unique names across the networked nodes;
the local object stores sharing one or more of the objects; and
an application using the local object stores for storing persistent data as objects, the application requiring a reference count for each object stored on the networked nodes comprising a number of references to the respective object;
means for maintaining a local reference count LRC of references to object names on each node, the value of the LRC comprising a sum of reference count adjustments on the local node, wherein the LRC is independent of any instance of the referenced object being stored in the local object store so as to allow a negative value of the LRC; and means for determining a global reference count GRC comprising a sum of the LRCs.

In accordance with another embodiment of the invention, an apparatus is provided comprising:

a plurality of networked nodes, each node having a local object store for storing objects on the respective node and the objects having globally unique names across the networked nodes;

the local object stores sharing one or more of the objects; and an application using the local object stores for storing persistent data as objects, the application requiring a reference count for each object stored on the networked nodes comprising a number of references to the respective object;

means for maintaining a local reference count LRC of references to object names on each node, the value of the LRC comprising a sum of reference count adjustments on the local node, wherein the LRC is independent of any instance of the referenced object being stored in the local object store so as to allow a negative value of the LRC; and means for selecting, based on network or system performance or reliability, one or more of the local object stores as locations for storing object instances independent of the object name.

These and other aspects of the present invention are more particularly described below in regard to various detailed embodiments.

BRIEF DESCRIPTION OF THE DRAWINGS

The accompanying drawings illustrate one or more embodiments of the present invention wherein.

DETAILED DESCRIPTION

In one embodiment of the invention a data storage system is distributed across a plurality of nodes on a network, each node having its own local object store and the local object stores sharing objects. This group of networked nodes follows a universal naming convention, wherein each object stored on the network has a globally unique name across the network. In this embodiment the plurality of nodes operate as a peer-to-peer network, with no node being primary. There is no centralized naming authority; instead, local agents on each of the local nodes can independently determine and agree on the object name by utilizing a common hash algorithm to determine the object's name, without requiring communication between the nodes. By using a strong hash algorithm collisions are avoided.

In this embodiment, the plurality of local object stores is intended to manage billions of objects, each object being small, e.g., 4, 8, 16, 32, 64, 128 or 256 KB (kilo bytes) in length. The objects in the object store are opaque, comprising an arbitrary plurality of bits. The object store has no semantic knowledge of the bits; rather, a higher layer application, such as a file system, or alternatively a block storage system, defines the semantic content (meaning) and relationships or references between objects. Each local object store contains a local index for mapping an object name to a physical location (e.g., pointer to a physical location) where an object instance may be stored locally. Each local object store also maintains a local reference count LRC for an object name. However, contrary to the prior art, the local reference count of an object name is decoupled from (independent of) the object instances. The LRC is maintained as a signed integer, and consists of a running total of references to object names as opposed to a count of object instances. Also distinguishing the LRC is its maintenance as a signed integer, thus allowing negative values. Adjustments are made to the LRC for each new reference and de-reference accordingly, i.e., +1 to add a reference, and −1 to remove a reference.

In one example, a file system application maintains a global reference count comprising the number of times an object is referenced in the file system. Here, where the file system storage of persistent data is implemented collectively on one or a plurality of local object stores on the plurality of nodes, the global reference count from the file system view comprises the number of references across the plurality of networked nodes to the respective object. In one embodiment, the file system may be implemented as a physical device known as a filer, which includes both the file system and a storage system, and which uses file transport protocols, such as NAS. In another embodiment, in addition to or instead of a file system, a block storage server uses the local object stores collectively on one or a plurality of nodes, for storing persistent data objects. The block server is a physical device that appears as virtual disks stored on a plurality of physical storage disks and uses block transport protocols, such as iSCSI or FCoE.

By decoupling the local reference count from object instances the system allows placement of objects (instances) on any one or more of the local nodes without regard to object properties. Instead, the local nodes each maintain a local reference count of references to object name that comprises a history (summation) of reference count adjustments on the local node. These local reference counts are no longer tied to the number of object instances according to the application (e.g., file system or block server), and thus the value of the local reference count can be a negative value (which would not be possible if they were tied to the number of object instances). By decoupling the reference counts from the number of instances, the objects can be placed anywhere on the network for reasons of improved network or system performance or reliability, or any other reason, independent of the global reference count or local reference count. This is in contrast to prior art algorithms for placement of objects, such as distributed hash table and other similar algorithms, which limit placement based on the object name. In contrast, in accordance with the present invention one can make as many instances of an object as desired across the nodes, or as few as desired for any purpose, e.g., to reduce the network traffic, reduce processing time, or for data replication or recovery purposes.

According to another aspect of the invention, a problem arises by decoupling the number of instances from the reference count, i.e., it is no longer possible to rely on the local reference count to determine whether an object can be safely deleted. In accordance with one embodiment of the invention, this problem is solved by calculating a global reference count (GRC), comprising the sum of all the local reference counts across the network nodes. This GRC will be exactly equal to the sum of all references to an object across all of the network nodes. An object may be de-allocated (e.g., deleted) if and only if its GRC is zero. However, knowing the GRC is difficult as local reference count adjustments are not coordinated with other nodes of the network, and ideally, one would like to calculate the GRC while the system is being actively modified (e.g., objects are being read and written on the local nodes).

According to one embodiment of the invention, the GRC is determined by assigning ownership of object identifiers (here object names) in the global namespace, to different nodes in the network. Not all nodes in the network need to own a portion of the namespace. However, the entire namespace must be covered by all or a subset of the nodes. The node that owns a range of identifiers initiates the calculation of GRC(s) for one or more objects in the range, and the resulting de-allocation of objects (e.g., garbage collection). According to one embodiment, a network protocol based on eventual consistency is utilized, wherein the GRC is calculated while the system is still being actively modified (e.g., objects are being read or written and object reference counts are being modified). As described in greater detail below, the owner node provides a tag for the one or more object identifiers for which a GRC is to be determined, the local nodes use this tag to label the respective objects (enabling activity on the nodes to continue), and the nodes exchange tagged messages, wherein all nodes provide the owner node with their local reference counts for the respective objects enabling the owner node to calculate the GRC as a sum of the local reference counts.

In a similar manner, the owner node can initiate and carry out an instance reconciliation, wherein the owner node receives messages from all of the local nodes concerning the number of instances of an object at each respective node. The owner node can then calculate a desired number and location of instances across the network nodes according to SLAs (service level agreements) and other metrics, and then instruct the other nodes to carry out the desired additions or deletions of object instances.

These and other aspects of the present invention will be more particularly described below in regard to the embodiments shown in the accompanying drawings. These embodiments are provided as examples, and various modifications will be readily apparent to those skilled in the art. Thus, the present invention is not intended to be limited by the disclosed embodiments. Some introductory material is included as background, providing a context for the embodiments.

Figure 1:
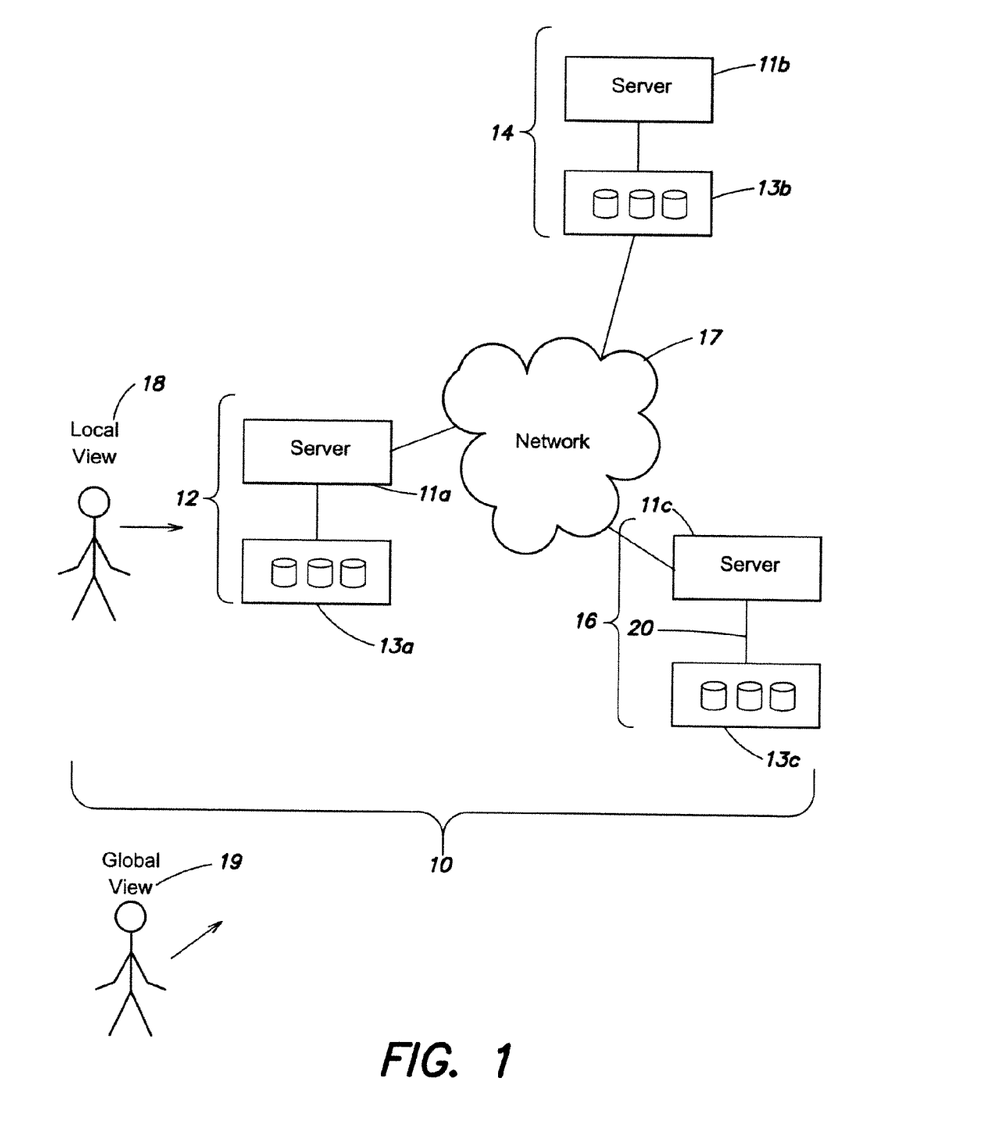
FIG. 1 is a schematic illustration of a plurality of networked nodes for practicing one embodiment of the present invention.

FIG. 1 is a schematic diagram of a computer network, here a plurality of networked nodes 12, 14, 16 in a peer-to-peer network 10. Each node includes a server 11a, 11b, 11c, which servers are coupled together by a network (shown as cloud 17) and communicate with one another using standard communication protocols, such as TCP/IP. The server 11 can be any type of server including but not limited to Intel based servers (e.g., an IBM 3650 server).

Each node 12, 14, 16 is referred to as a local node in the view of a local 15 user 18, and includes both server 11 and data storage 13 (shown here as a plurality of storage disks). These local components are coupled together and communicate via a system bus 20. Each server may include a processor, memory, and network interface, and may further include user interface devices such as a display, keyboard and/or mouse. The network interface couples each server to the network of nodes.

Globally, the plurality of networked nodes is referred to as a global network 10. A user 19 viewing this global network has a global view of the network. As described below in accordance with various embodiments of the invention, software and/or hardware is provided at each of the network nodes for performing the various system and method embodiments of the invention.

Figure 2:
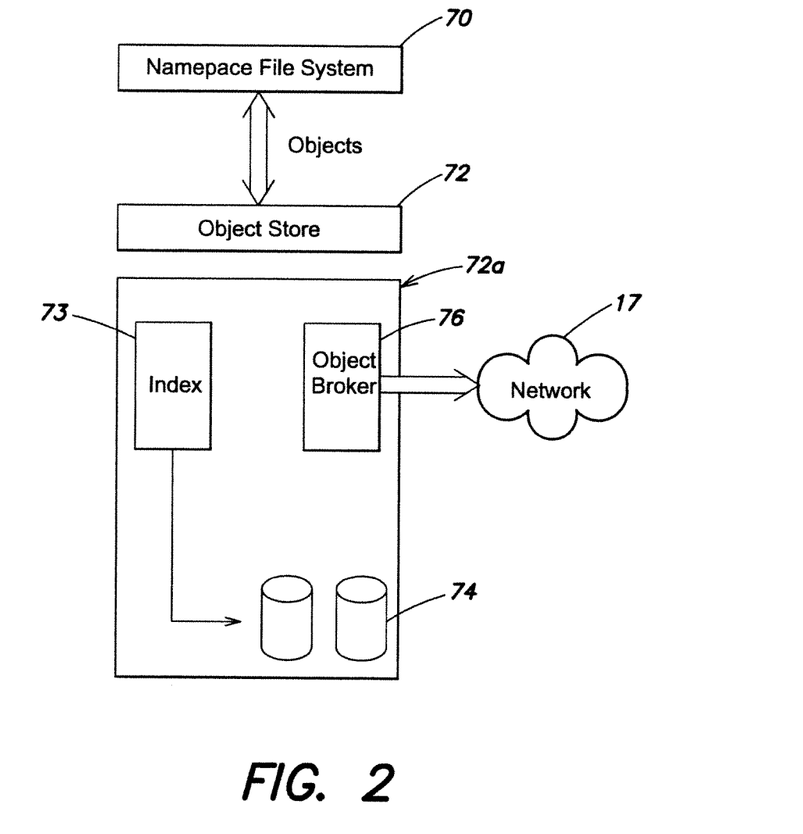
FIG. 2 is a schematic illustration of a local object store on one node of the network that communicates with the network via an object broker.

FIG. 2 illustrates one embodiment of an object based file system for use in the present invention. As more specifically described in co-pending and commonly-owned U.S. Ser. No. 12/823,922 filed 25 Jun. 2010 and entitled File System, the entirety of which is hereby incorporated by reference, a computer program and/or electronic circuitry product is provided for naming and storing files on one or more computer storage devices. The product comprises executable instructions or logic circuitry for implementing a namespace file system 70 utilizing an object store 72. In one example, the namespace file system is a layer in a storage stack between a virtual file system layer and a block storage abstraction layer. All file system data comprises objects, including data, metadata, and files. Each object has an object fingerprint as its object name, the fingerprint being a hash of the object content. A collection of file system objects also comprises an object of the object store, each collection comprising a mapping of a plurality of file system objects and having its own object fingerprint derived from the contents of the collection, wherein a change to one or more objects of the collection changes the collection object fingerprint. A file system root object has an object fingerprint derived from all of the objects in the file system, such that every object in the namespace file system is accessible through the root object. Tracking changes in the root object provides a history of file system activity, i.e., file system snaps. An inode map object is provided comprising a mapping of file system inode numbers and file system object fingerprints, making the file system POSIX compliant.

As shown in FIG. 2, the object store of U.S. Ser. No. 12/823,922 has been modified according to the present invention to function in a plurality of networked nodes. FIG. 2 illustrates a global namespace file system 70 that utilizes an object store 72 for storing all persistent data objects of the file system. As described further below, the namespace file system 70 now utilizes a plurality of peer-to-peer local object stores residing on a plurality of networked nodes 12, 14, 16, as shown in FIG. 1. For this purpose, each local node 72a now includes a local mapping index 73, physical storage (disks) 74, and an object broker 76, which interfaces with the network 17, for sending/receiving communications regarding the allocation and tracking of objects shared among the local nodes 12, 14, 16.

Figure 3:
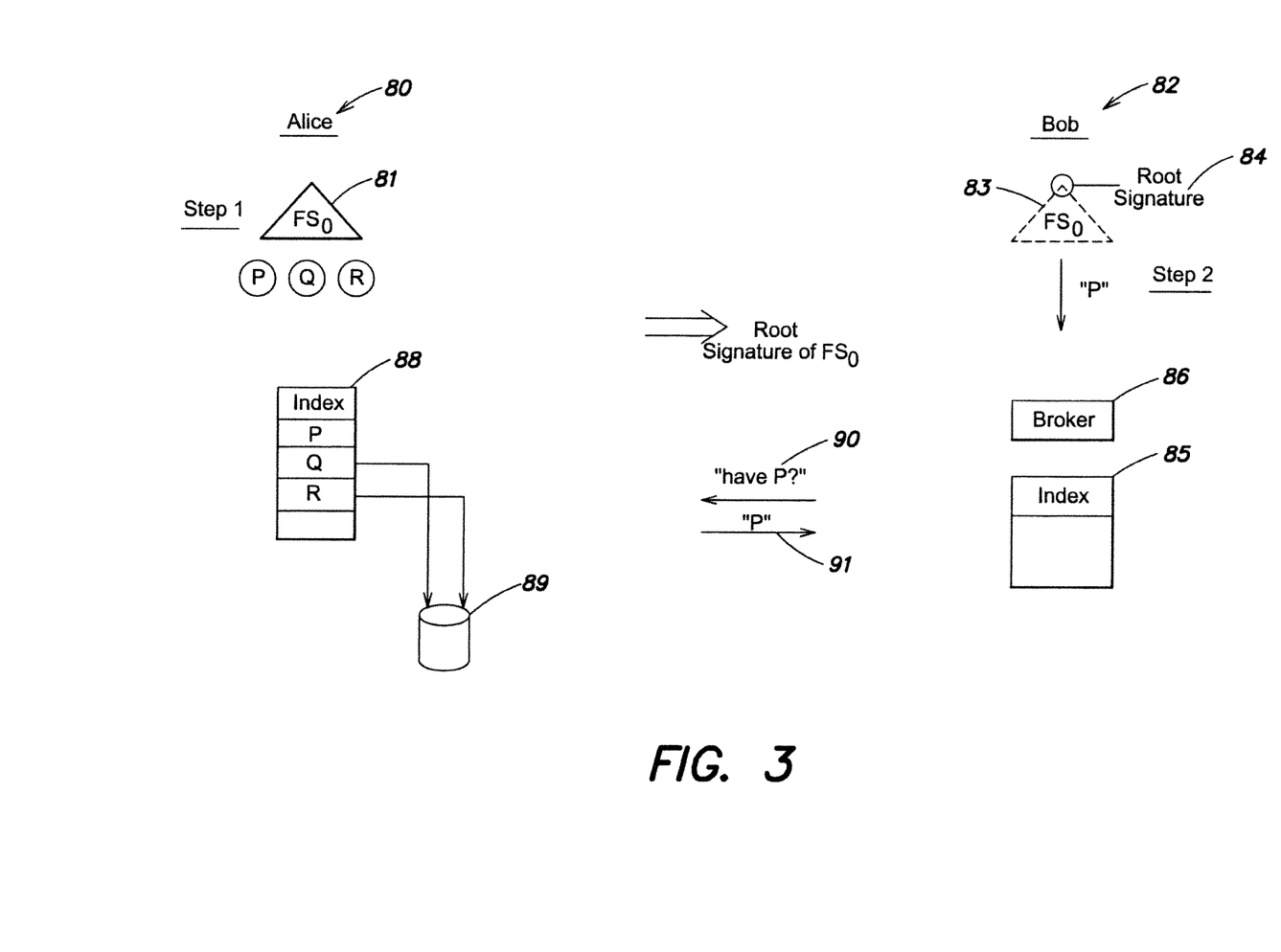
FIG. 3 is a schematic illustration of the sharing of objects between two network nodes Alice and Bob.

FIG. 3 illustrates schematically the operation of a distributed object store according to one embodiment of the invention, wherein a namespace file system shares a plurality of local object stores residing on various local nodes of the network. In the illustrated embodiment, a first local node 80 is referred to as Alice and a second local node 82 as Bob. A file system $FS_o$ 81 resides on node Alice and references objects P, Q and R. A copy of $FS_o$ can be published on node Bob simply by sending the $FS_o$ root signature to node Bob (step 1). Because the root signature references an object that in turn is derived from all of the objects in the file system, every object in the namespace file system is accessible through the root object. Thus, it is not necessary to transfer the referenced objects (P, Q, R) themselves, to node Bob. This publishing of the file system $FS_o$ on Bob is shown as a dashed triangle 83, with the file system root object designated as a non-dashed circle 84 on node Bob, to show that the root object is now residing on node Bob.

If $FS_o$ on node Bob subsequently needs object P (step 2), it will check its local index 85 on node Bob and find that P does not reside on node Bob. The node Bob object broker 86 will therefore send a request message 90 to the other nodes of the network, asking if they have object P. In this example, node Alice receives the request and checks its local index 88, which shows that object P resides on Alice's local object store 89. Node Alice sends a response message 91 to node Bob with an instance of P. Object P may now be stored on the local object store of node Bob.

Figure 4:
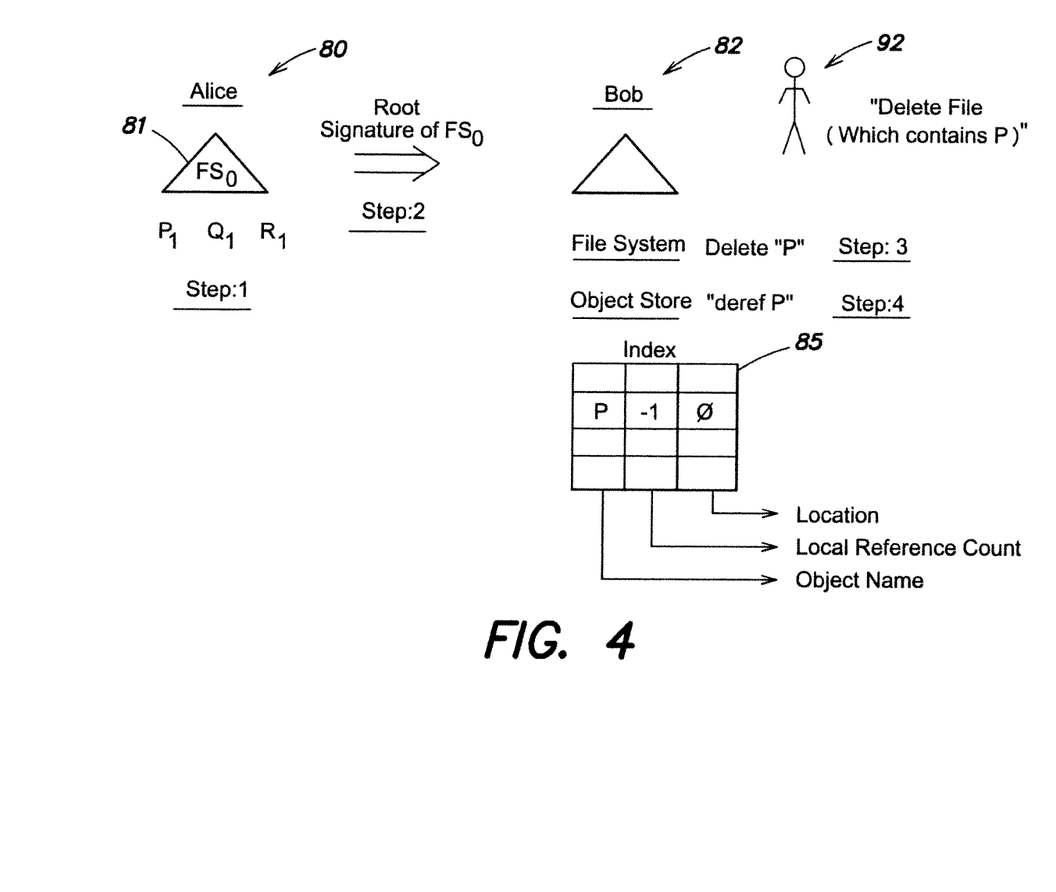
FIG. 4 is a schematic illustration of a local mapping index at node Bob.

FIG. 4 illustrates a further example of object sharing on the distributed object store, and more specifically how local reference counts LRCs, maintained at the local nodes, are allowed to have a negative value. Here again a File System $FS_o$ 81, with objects P, Q and R, resides on node Alice 80 (step 1). A copy thereof is transferred to node Bob 82 (step 2), by sending the file system root object from node Alice to node Bob. A local user 92 at node Bob then provides instructions (step 3) to delete a file, which file is part of the File System $FS_o$, and which file happens to contain P. In an attempt to implement this instruction by de-referencing P (step 4), node Bob checks its local object store for references to object P. However, the local mapping index 85 on node Bob shows a reference count of zero for object P. In order to implement the delete instruction for object P, the reference count for P on the local index entry is decremented by one, from zero (0) to minus one (−1). This ability to maintain a negative valve for the local reference count LRC preserves the reference values on a global view (i.e., across the network of nodes) without requiring an immediate search for or reconciliation of object instances across the network, which would generate undue network traffic. Instead a reference count reconciliation across the nodes, namely a global calculation of reference counts GRC, can be conducted later, when desired, to determine if it is appropriate to de-allocate all instances of object P across the network (e.g., for garbage collection).

Figure 5:
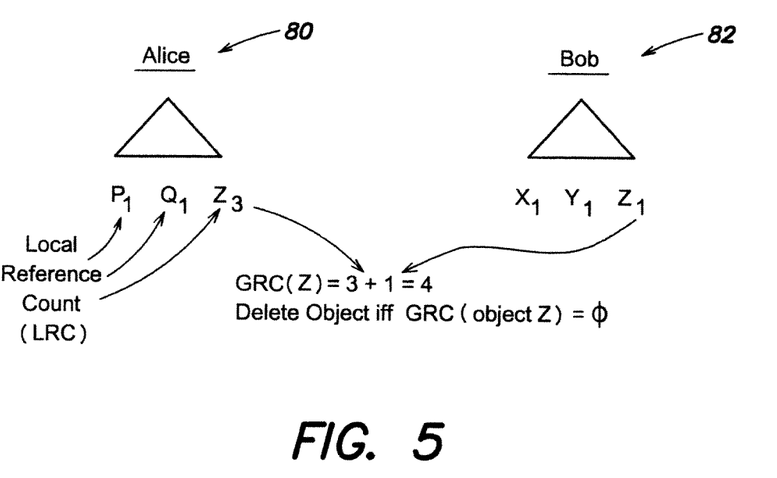
FIG. 5 is a schematic illustration of a global reference count reconciliation between nodes Alice and Bob of the network.

FIG. 5 further illustrates an example of a global reference count determination. The global reference count, GRC, is the sum of all references across the networked nodes to an object referenced by a given application. The GRC is determined by summing all of the local reference counts, LRCs, stored on the various local nodes. Here we assume that it is possible, at a given instance of time, to know all of the LRCs, in order to calculate GRC. With this assumption, FIG. 5 illustrates the local object store index on node Alice 80 which includes an entry for object P with a local reference count of positive one (+1), object Q with a local reference count of positive one (+1), and object Z with a local reference count of positive three (+3). Node Bob 82 has a local object store index with entries for object X with a local reference count of positive one (+1), object Y with a local reference count of positive one (+1), and object Z with a local reference count of positive one (+1). The GRC for object Z at this time is the sum of the local reference counts for Z on node Alice, which is positive three (+3), and on node Bob, which is positive one (+1), such that the GRC for object Z is positive four (+4). This indicates that there still exists references in the network nodes to the object Z, and Z should not be de-allocated. Only if the GRC for object Z is zero, is it safe to de-allocate the object Z.

Figure 6:
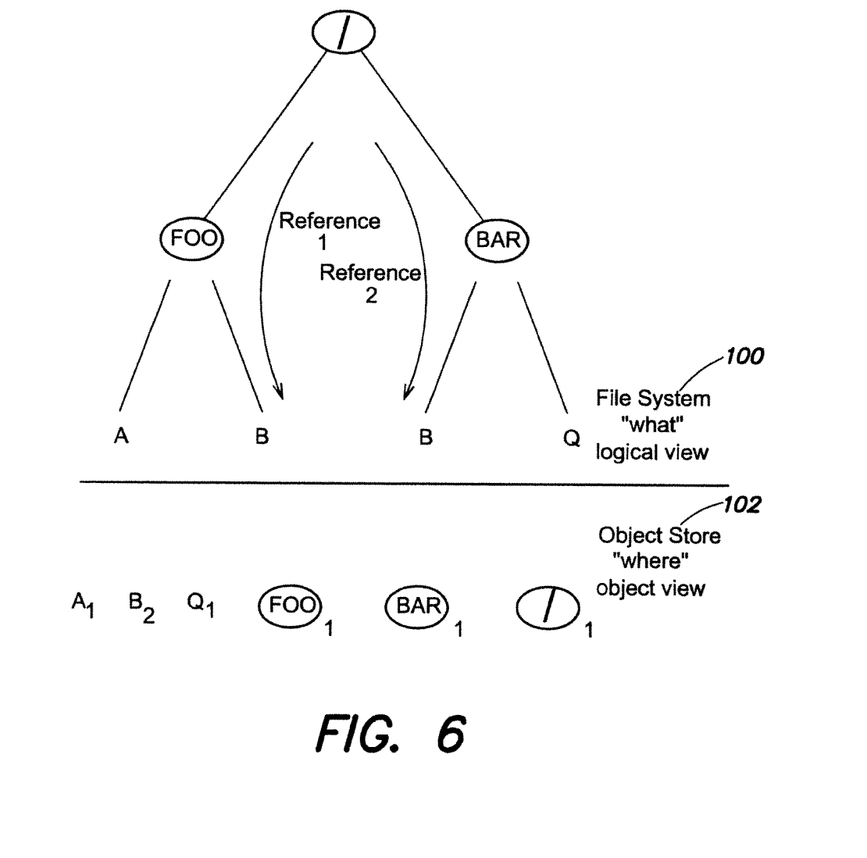
FIG. 6 is a schematic illustration of a file system logical view, illustrating multiple independent references to an object from the view of the application.

FIG. 6 illustrates the concept of independent references to an object in a file system, and how a file system 100 that utilizes an object store 102 maintains a file system logical view of the objects (i.e., knowledge of the contents of the object) while the object store 102 maintains a physical view of the object locations (where the objects are stored). In FIG. 6, two independent references are illustrated in a tree structure; at the top or root of the tree a slash (/) indicates a particular file system. Below the top node of the tree are two branches to each of file FOO and file BAR. Below file FOO are branches to objects A and B. Below object BAR are branches to objects B and Q. In this example there are two independent references to the object B, one through the file FOO and the other through the file BAR. The object store thus includes a reference count of two (2) for object B ($B_2$). The remaining objects A, Q, FOO, BAR and/each have a reference count of one.

Figure 7:
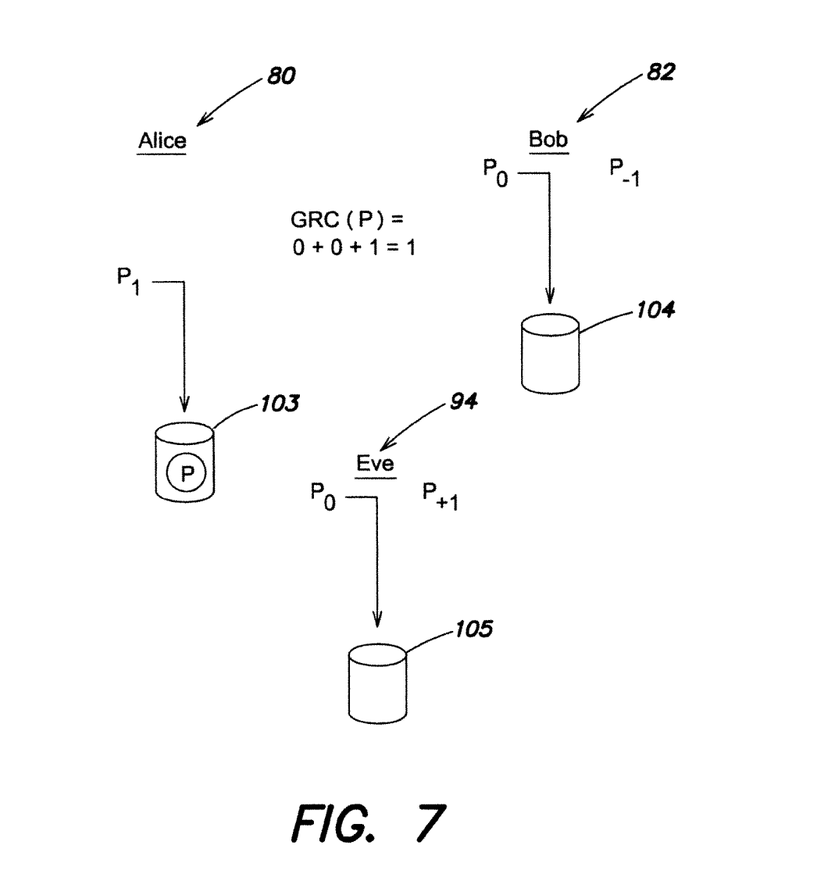
FIG. 7 illustrates one example of tracking object references on three nodes of the network, wherein negative reference counts are allowed according to the present invention.

FIG. 7 further illustrates how the decoupling of object references and object instances in accordance with the present invention can be allowed while still enabling a determination of a global reference count across the network of nodes. In the present invention, a local reference count alone does not determine whether an instance can be deleted. Instead, as previously described, it is only the global view obtained by summing all of the local reference counts that determines whether it is safe to de-allocate all instances of an object (because there are no longer any references in the file system to that object). For example, FIG. 7 illustrates network nodes Alice 80, Bob 82 and Eve 94. A file FOO includes an object P which is stored in the local object store 103 on node Alice, and the index on node Alice has a local reference count of positive one (+1) for the object P. Node Bob 82 does not have a copy of object P stored in its local object store 104, and the local reference count for object P is negative one (−1). Node Eve 94 has no instance of object P in its local object store 105, and the local reference count for object P is positive one (+1). Thus, on node Bob and node Eve the reference counts for object P have no relation to whether there is an instance stored on the respective node Bob or node Eve. However, when the global reference count GRC for object P is calculated, comprising the sum of the three local reference counts for object P, the calculated sum is positive one (+1), indicating that there is still a reference to object P and P should not be de-allocated.

Figure 8:
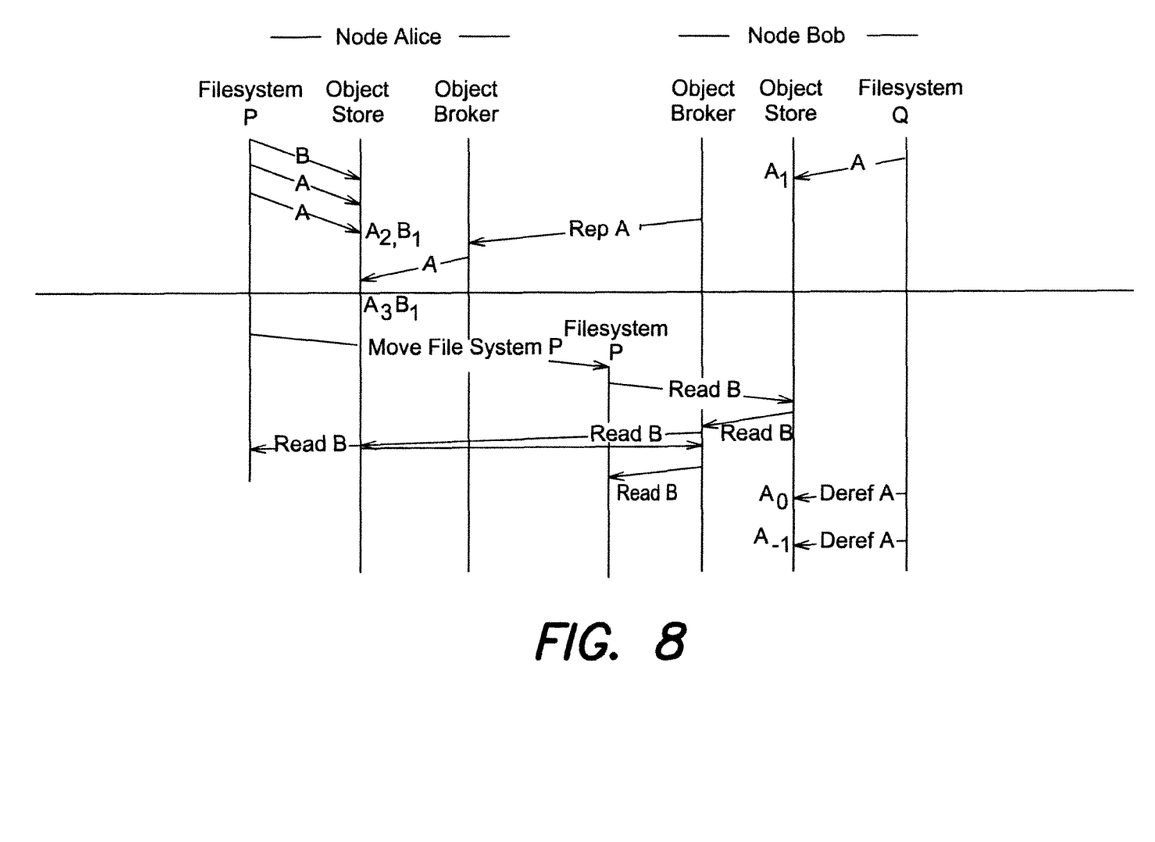
FIG. 8 is a flow diagram of communications between two nodes Alice and Bob on the network for maintaining local reference counts.

FIG. 8 is a flow chart illustrating one example of the maintenance of local reference counts across the plurality of nodes. As previously described, for any object O the global reference count of O for file System P exactly matches the sum of all references to object O across the networked nodes, assuming all pending reference counts have been fully propagated throughout the File System A. In FIG. 8, local node Alice and local node Bob each have their own local object store and object broker. File System P on node Alice includes objects A and B. File System P has two references to object A on node Alice, and the local reference count of object A on node Alice is positive two ($A_2$). The local reference count of object B is positive one ($B_1$) on node Alice. File System Q on node Bob has referenced object A one time, and thus the local reference count for object A on node B is positive one ($A_1$).

The object broker on node Bob now wishes to replicate object A to node Alice. The object broker on node Alice receives a request sent by node Bob and increments the local reference count for object A on node Alice to positive three ($A_3$).

Later, File System P on node Alice wishes to move a copy of the File System P to node Bob. When File System P on node Bob reads object B, it fails to find object B in the local object store on node Bob. The object broker on node Bob then sends a read request for object B to node Alice. The object broker on node Alice reads B from the local object store on node Alice, sends object B to node Bob, and object B is then provided to File System P on node Bob.

Later, File System Q on node Bob de-references its first reference to A, decreasing the local reference count for object A to zero ($A_0$). Subsequently, File System Q on node Bob issues a second dereferencing of object A, reducing the local reference count for object A on node Bob to minus one ($A_{-1}$). In the prior art, negative reference counts are not allowed and node Bob would have to communicate with the other nodes and find another node to accept object A's negative reference count. However, in accordance with the present invention, there is no need to conduct an immediate reconciliation and this network traffic is avoided. Instead, reconciliation can be postponed until desired, as described further below.

According to another aspect of the invention, the local nodes are given ownership of a specific range of object identifiers, or keys (here object names) in the total keyspace. The owner node is responsible for initiating a reference count propagation. Not every node in the storage system needs to own a portion of the keyspace. However, the entire keyspace must be covered by some set of nodes. The owner (node) of the key is responsible for calculating the global reference count GRC of the corresponding object. In one embodiment, the method includes tallying both the local reference counts and local instance counts. In other embodiments, tallying of one or the other may be performed.

In one example, a tallying process may include the following steps:

a. owner node (tagging)
   the owner creates a unique Tag which is an identifier for indicating a calculation of GRC at a particular point in time;
   the owner decides on the range of keys RK for which the GRC is to be calculated;
   the owner sends (RK, T) to all nodes in the storage system.

b. recipient node(s) (accumulation)
   for each (RK, T) received, the recipient must tag all keys that are local with T;
   any further modifications to a key in RK after the posting of tag T, must be distinct;
   for each key in RK, the recipient sends its local reference count, and the local number of instances back to the owner node along with the tag T.

c. owner node (reconciliation)
   the owner sums the local reference counts received from the other nodes, along with its own local reference count to determine the global reference count. If the global reference count is zero, the owner then sends a delete message with the tag T to all other nodes, and deletes any local instance of the key on the owner node;
   the receiving nodes, and the owner node, may not actually delete the object if there was activity after the posting of T to the object; the owner also reviews the number of instances of the object on various nodes of the network, and determines whether various instances may be added or deleted to improve performance or the like.

d. recipient node(s) (action)
   the recipient carries out the delete instruction, and sends an acknowledgement back to the owner with T;
   the recipient carries out the instructions regarding instance creation if so directed, and sends an acknowledgement back to the owner with T.

This method of reconciliation provides "eventual consistency". The order in which the messages between the nodes are received or processed is not important, as long as they all get back to the owner node, eventually. The tag acts as a barrier enabling the recipient node to continue activity on the set RK, while the nodes are engaged in the reconciliation process. In one embodiment, the tag is a GUID (Globally Unique ID).

Figure 9:
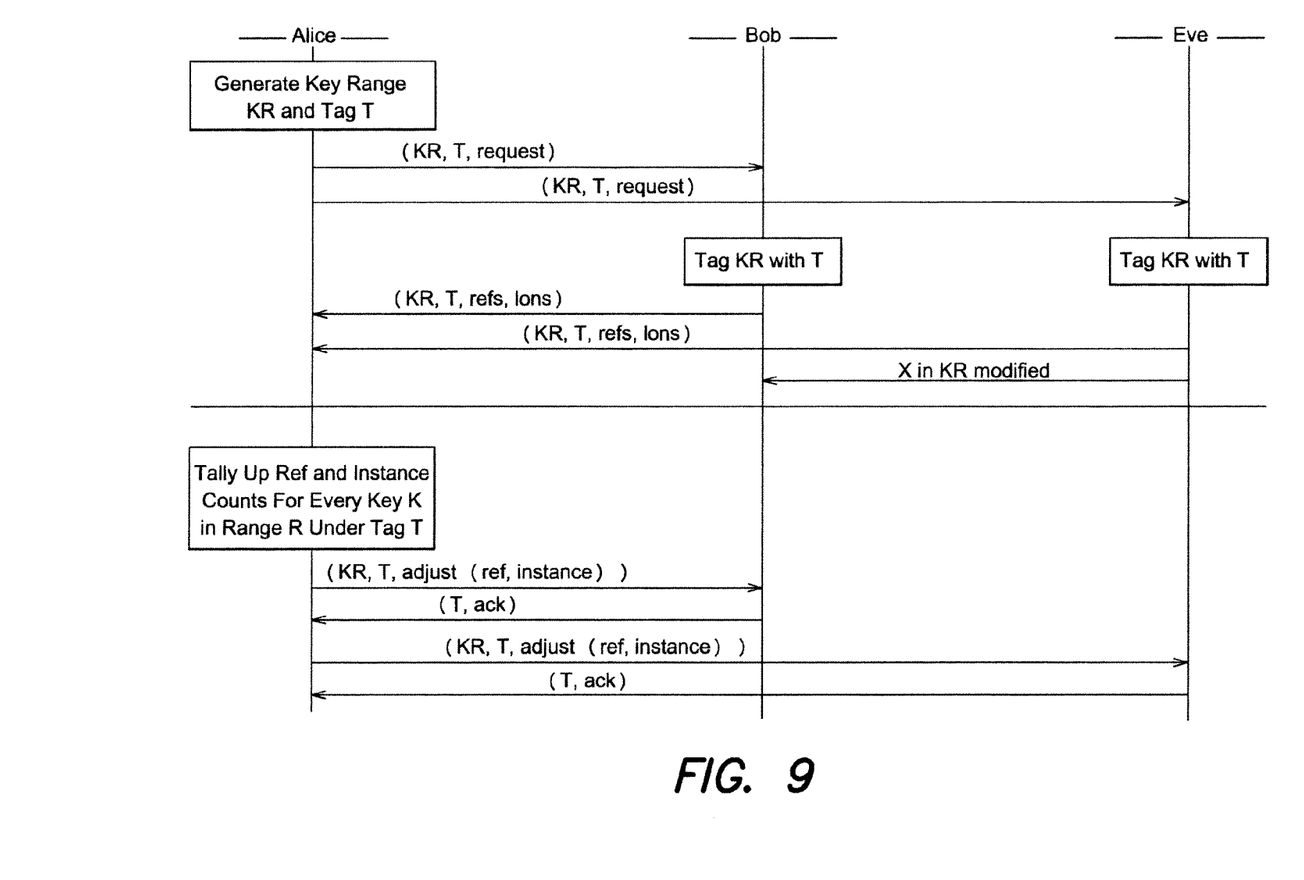
FIG. 9 is a schematic illustration of network communications between three nodes Alice, Bob and Eve for implementing a reconciliation of both reference counts and instance counts across the network nodes.

One example of this tagging and tallying process is illustrated in FIG. 9. Here, node Alice owns a portion of the keyspace and decides to work on a sub-portion of that range. Alice generates a unique tag T and sends out an accumulate request for both local reference counts and local instance counts for the desired range KR, along with the tag T.

Nodes Bob and Eve eventually receive the request from Alice for a key range KR, tag T. The request can arrive at nodes Bob and Eve in any order. Each recipient node must tag the key range. If for example an object X in the key range KR on node Bob is to be modified, Bob must create a barrier, e.g., there are now two objects X: one object $X_{tag}$ and the other object $X_{other}$. Each recipient node then responds to node Alice for every key K in the range R with the following: the local reference count (refs), and the number of instances (pointers to physical instance, Ions) on the local node.

Owner node Alice now has enough information to calculate the global reference count and global instance count for every key K in Range R under tag T. Alice accumulates the responses from all nodes. If the global reference count GRC for an object is zero, Alice may send instructions to all nodes to de-allocate the object. The recipient responds with an acknowledge message. Alice may apply various methods (e.g., service level agreements) for determining whether instances should be created or deleted on one or more of the other nodes. Only if the global reference count is zero, may all instances be deleted.

Further Embodiments

The present invention may be used to implement a file system and/or an index for a file system, such as disclosed in co-pending and commonly owned U.S. Ser. No. 12/823,922, entitled File System, by A. J. Beaverson and P. Bowden, and U.S. Ser. No. 12/823,452 entitled Scalable Indexing by P. Bowden and A. J. Beaverson, both filed on 25 Jun. 2010, and both claiming priority to U.S. Provisional No. 61/269,633 filed 26 Jun. 2009. Priority is claimed herein to each of these applications and the complete disclosures of each are hereby incorporated by reference in their entirety.

Embodiments of the invention can be implemented in digital electronic circuitry, or in computer hardware, firmware, software, or in combinations thereof. Embodiments of the invention can be implemented as a computer program product, i.e., a computer program tangibly embodied in a computer-readable medium, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communications network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magnetooptical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention.

The invention claimed is:

1. A non-transitory computer-readable medium containing executable program instructions for performing a method comprising:
   in a plurality of networked nodes wherein each node has a local object store, the local object stores storing objects and sharing one or more objects, the objects having globally unique names across the networked nodes and wherein the object names do not change based upon where the objects are stored on the nodes;
   maintaining, at each node, a Local Reference Count LRC of local references to object names, independent of any object instance stored in the local object store, the LRC being maintained as a signed integer, wherein adjustments are made to the LRC for each local new reference and dereference and a de-referencing of an object name can generate a negative LRC value;
   wherein ownership of object names are assigned to different nodes, a range of object names being assigned to one of the network nodes and the node assigned ownership initiates a Global Reference Count GRC determining step for all or a subset of the range, the GRC determining step comprising:
   the owner node providing a unique tag for an object for which a GRC is to be determined;
   the nodes exchanging messages with the unique tag, whereby, the other nodes provide the owner node with their LRC for the object;
   the owner node calculating the GRC as a sum of the LRCs received from the other nodes and the LRC of the owner node for the object; and
   if the resulting GRC is zero the owner node sending a delete message with the unique tag to the other nodes.

2. The medium of claim 1, wherein the method includes: the owner and other nodes delete the object when the GRC is zero.

3. The medium of claim 2, wherein the determining step includes:
   the nodes operate as a peer-to-peer network of nodes.

4. The medium of claim 3, wherein
   the GRC is calculated while the objects are being read or written and local object reference counts are being modified.

5. The medium of claim 1, wherein the local object stores collectively comprise a namespace of the globally unique object names.

6. The medium of claim 1, wherein the method includes:
   the local object store maintains a local mapping index of object name, LRC and a pointer to any physical object location where the object is stored on the local object store.

7. The medium of claim 1, wherein the method includes:
   each object has an object fingerprint derived from the object's content as its object name.

8. The medium of claim 7, wherein the method includes:
   the fingerprint comprises a hash of the object content.

9. The medium of claim 1, wherein a file system uses the local object stores collectively as a method to store all persistent data of the file system.

10. The medium of claim 9, wherein the method includes:
    all file system data, metadata and files comprise objects of the object store(s), each object having an object fingerprint as the object name;
    collections of file system objects also comprise objects of the object store(s), each collection comprising a mapping of a plurality of the file system objects and having a collection object fingerprint derived from the contents of the collection, wherein a change to one or more objects of the collection changes the collection object fingerprint; and
    a file system root object having a root object fingerprint derived from all of the objects of the file system, such that every object in the namespace file system is accessible through the root object.

11. The medium of claim 1, wherein the method includes:
    selecting, based on network or system performance or reliability, one or more of the nodes as location(s) for storing one or more instances of an object independent of the object name.

12. The medium of claim 1, wherein the method includes:
    the sharing of the stored objects comprises communicating between nodes with regard to object names, LRCs and locations of stored objects.

13. The medium of claim 1, wherein the method includes:
    when an application de-references an object name and a copy of the object is not stored on a local node, the local node generates an LRC of negative one.

14. The medium of claim 1, wherein
    a storage system uses the local object stores collectively as a method to store all persistent data of the storage system.

15. An apparatus comprising:
    a plurality of networked nodes, each node having a local object store for storing objects on the respective node and the objects having globally unique names across the networked nodes, wherein the object names do not change based upon where the objects are stored on the nodes;

the local object stores sharing one or more of the objects;

an application using the local object stores for storing persistent data as objects, the application requiring a reference count for each object stored on the networked nodes comprising a number of independent paths across the plurality of nodes to the respective object;

means for maintaining a local reference count LRC of references to object names on each node independent of any object instance stored in the local object store, the LRC being maintained as a signed integer;

wherein adjustments are made to the LRC for each local new reference and dereference, wherein a de-referencing of an object name can generate a negative LRC value; and means for determining a Global Reference Count GRC for an object, wherein ownership of object names are assigned to different nodes, a range of object names being assigned to one of the network nodes, and the node assigned ownership is configured to cause the determining means to initiate a GRC determining step for all or a subset of the range, the GRC determining means and the nodes configured to implement GRC determining steps comprising:

the owner node providing a unique tag for an object for which a GRC is to be determined;

the nodes exchanging messages with the unique tag, whereby, the other nodes provide the owner node with their LRC for the object;

the owner node calculating the GRC as a sum of the LRCs received from the other nodes and the LRC of the owner node for the object; and if the resulting GRC is zero the owner node sending a delete message with the unique tag to the other nodes.

* * * * *